United States Patent [19]
Kress et al.

[11] 3,736,813
[45] June 5, 1973

[54] COMBINED HYDROSTATIC AND MECHANICAL TRANSMISSION

[75] Inventors: James Henry Kress, Cedar Falls; Richard Arlo Michael, Waterloo; Lyle Robert Madson, Cedar Falls, all of Iowa

[73] Assignee: Deere & Company, Moline, Ill.

[22] Filed: Dec. 27, 1971

[21] Appl. No.: 211,968

[52] U.S. Cl. .................................. 74/740, 74/687
[51] Int. Cl. ........................... F16h 5/36, F16h 47/04
[58] Field of Search .............................. 74/740, 687

[56] References Cited
UNITED STATES PATENTS

| | | | |
|---|---|---|---|
| 3,132,533 | 5/1964 | Baker | 74/687 |
| 3,487,724 | 1/1970 | McIntyre et al. | 74/740 |
| 3,580,107 | 5/1971 | Orshensky, Jr. | 74/687 |

Primary Examiner—Arthur T. McKeon
Attorney—H. Vincent Harsha, Harold M. Knoth and William A. Murray et al.

[57] ABSTRACT

A hydro-mechanical vehicle transmission has a constant speed engine-driven input shaft, which drives a variable displacement reversible hydraulic pump, which, in turn, drives a fixed displacement hydraulic motor at infinitely variable speeds between zero and a predetermined speed in either direction. The hydraulic motor drives the sun gear of the planetary gear train, while the input shaft drives the ring gear of the gear train, the carrier serving as the output of the gear train and being connected to an output shaft by means of a main transmission clutch. The output shaft provides the input to a four-speed forward, one-speed reverse collar shift transmission, which provides different speed ranges with infinitely variable speed characteristics within a limited range, the gear ratios being selected so that the ranges overlap to give infinitely variable output speeds over a relatively wide range.

15 Claims, 1 Drawing Figure

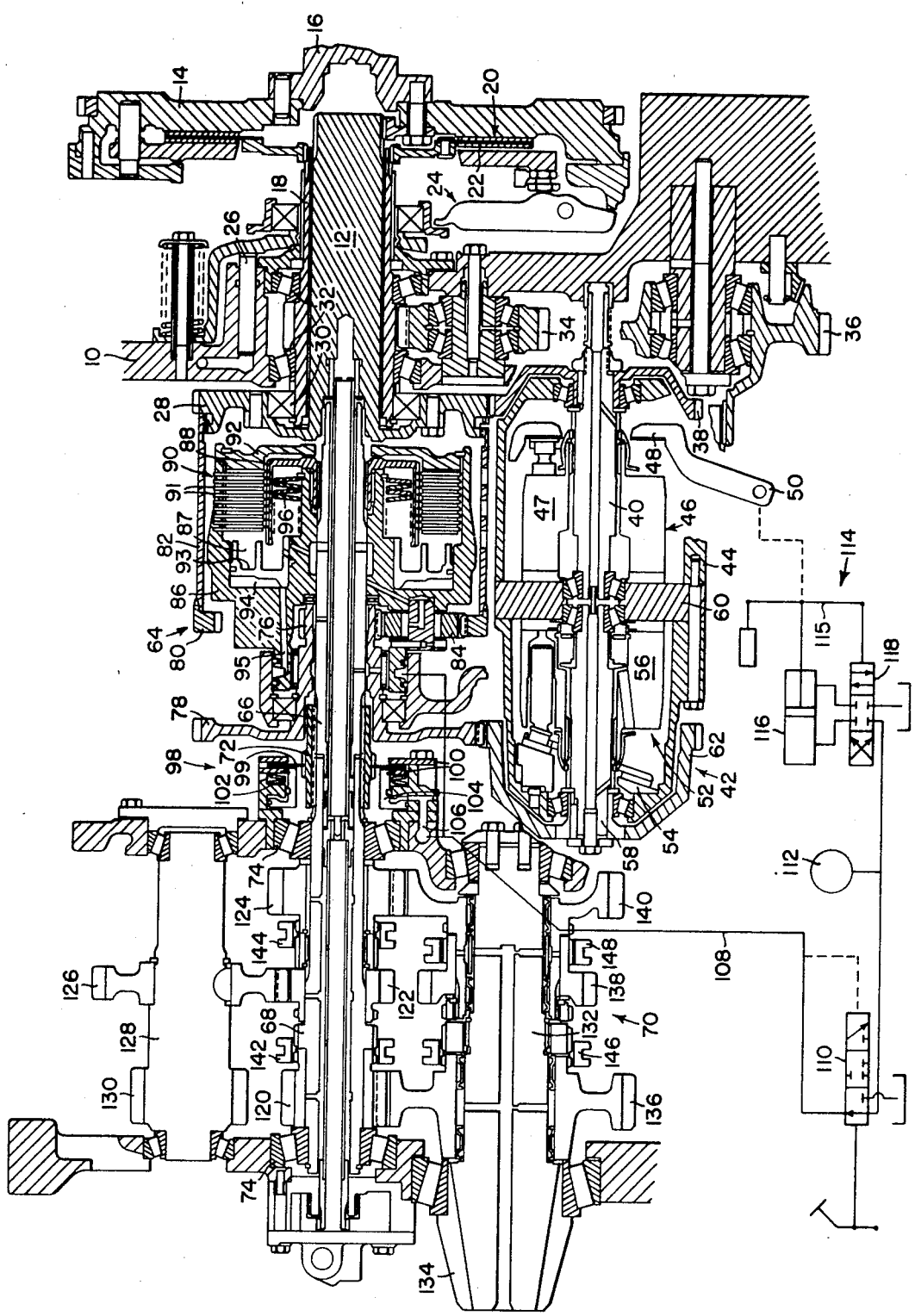

COMBINED HYDROSTATIC AND MECHANICAL TRANSMISSION

BACKGROUND OF THE INVENTION

This invention relates to an improved combination hydrostatic and mechanical transmission.

It is well known to provide hydrostatic transmission for agricultural or industrial tractors or the like, which conventionally have a relatively constant engine or input speed to the transmission, the hydrostatic transmission providing infinitely variable speeds. When the total power is transmitted through the hydrostatic drive, relatively large and expensive units are necessary. To reduce the size of the hydrostatic units, it is known to combine the hydrostatic unit with differential gearing, so that, in at least some of the transmission ranges, the hydrostatic units only transmit a portion of the total power, the remaining power being mechanically transmitted through a separate input to the differential gearing. Generally, such transmissions have utilized a type of clutching arrangement in the differential gearing to provide different connections between the various elements and thereby provide different speed ranges. However, such transmissions have generally required both a variable displacement pump and a variable displacement motor to obtain the necessary range of speeds and have also required relatively large units, since at least part of the time, all of the power is transmitted through the hydrostatic units.

SUMMARY OF THE INVENTION

According to the present invention, an improved hydro-mechanical transmission is provided, wherein the transmission has a plurality of speed ranges with infinitely variable speed characteristics. An important feature of the invention resides in the fact that the transmission uses relatively inexpensive components and is relatively compact to provide a very practical transmission for such vehicles as agricultural or industrial tractors. Also, the speed ranges are selected so that the vechicle can be operative at infinitely variable speeds throughout its entire operating range. More specifically, a relatively small and inexpensive hydrostatic drive unit is coupled with differential gearing to provide infinitely variable speeds within a limited range, and the differential gearing is coupled with a shiftable step range transmission to provide the necessary speed ranges with the infinitely variable speed characteristics. Another important feature of the invention resides in the fact that the hydrostatic drive unit transmits only a portion of the total power, and frequently transmits only a small portion of such power.

Another feature of the invention resides in the provision of a main drive clutch within planetary-type differential gearing. Still another feature of the invention resides in the provision of a brake which automatically stops the input shaft to the shiftable transmission when the main clutch is disengaged to facilitate shifting of the transmission into its different ranges.

Another feature of the invention resides in the selection of the gear ratios and the shiftable transmission to keep the required range shifts at a minimum.

BRIEF DESCRIPTION OF THE DRAWING

The sole FIGURE is a partly schematic axial section through the entire transmission with the transmission control being schematically illustrated.

DESCRIPTION OF THE PREFERRED EMBODIMENT

The invention is embodied in a transmission having a transmission housing 10, only selected portions of which are shown in the drawing. The transmission has an input shaft 12, which has its forward end (to the right in the drawing) splined to a flywheel 14, which is driven by an engine-driven shaft 16, only the rearward end of which is shown. The transmission is preferably used in agricultural or industrial tractors, which conventionally have a relatively constant speed engine, so that the shaft 16 and consequently the input shaft 12 is driven at a relatively constant speed.

A sleeve 18 is rotatably mounted on the shaft 12 and is connectible to the flywheel 14 by a PTO clutch 20. The clutch 20 is a dry type clutch and includes a clutch disc 22 splined to the end of the sleeve 18 and compressible into engagement with the radial face of the flywheel by a clutch actuating mechanism 24, which includes a plurality of actuating cylinders 26. The rearward end of the input shaft 12 is provided with a relatively large input spur gear 28, which is rotatably supported on the inner end of the sleeve 18 by a bearing 30, the sleeve 18 in turn being journaled in the housing 10 by a pair of bearings 32. The outer surface of the sleeve 18 is provided with gearing which meshes with a PTO gear 34, which in turn drives an idler gear (not shown), that drives a third PTO gear 36. As is conventional, the gear 36 is connnected to a rearwardly extending shaft, which drives the usual PTO mechanism on the tractor. As is apparent, the PTO output speed is independent of the rest of the transmission.

The input spur gear 28 meshes with and drives a spur gear 38 splined to an input shaft 40 of a hydrostatic drive unit, indicated in its entirety by the numeral 42. The hydrostatic drive unit 42 includes a variable displacement, reversible, axial piston pump 46, which includes a cylinder block 47 splined to the shaft 40 and carrying a plurality of pistons, which engage an adjustable swash plate 48. The swash plate 48 is shown in its neutral condition wherein it is normal to the axis of rotation so that rotation of the barrel does not cause the pistons to reciprocate, thereby producing a zero flow. In the preferred embodiment, the swash plate is adjustable through an arc of 18° in either direction from the neutral condition, the greater the swash plate angle, the greater the output flow, the direction of the flow depending upon the direction that the swash plate is adjusted from the neutral condition.

The hydrostatic drive unit 42 also includes a fixed displacement axial piston motor 52, which is coaxial with the pump 46 and includes a fixed swash plate 54 engageable by the conventional pistons, which reciprocate in the cylinder barrel 56 to cause rotation of the barrel and consequently of an output shaft 58 to which the barrel is splined. The pump and motor are coaxially disposed opposite one another on opposite sides of a valve inner face 60, which is secured to the housing 44 and has the conventional valve passages interconnecting valve ports on its opposite radial faces, which communicate with the valve ports in the cylinder barrel faces. The motor shaft 58 carries a cup-shaped gear element 62 at its rearward end, the gear element extending forwardly around the rearward end of the housing 44 and being provided with a spur gear on its outer surface.

A planetary gear train, indicated in its entirety by the numeral 64, is disposed parallel and adjacent to the hydrostatic drive unit 42 and includes an output shaft 66 having its forward end journaled in the rearward end of the input shaft 12 and its rearward end connected to an input shaft 68 of a shiftable step ratio transmission indicated in its entirety by the numeral 70. The shaft 66 is connected to the shaft 68 by an internally splined sleeve 72, and the shaft 68 is journaled in the housing by a pair of bearings 74, so that the rearward end of the shaft 66 is also rotatably supported relative to the housing.

The planetary gear train 64 includes a sun gear 76 journaled on the shaft 66 and integrally connected with an input gear 78 meshing with the hydrostatic output gear element 62, so that the sun gear is driven at variable speeds in either direction by the hydrostatic unit 42. The planetary gear train also includes an internal ring gear 80 having a forwardly extending sleeve portion 82 splined to the input gear 28, so that the ring gear 80 is driven at a constant speed in one direction. A plurality of pinion gears 84 constantly mesh with the sun and ring gears and are journaled on a planetary carrier 86, which is also journaled on the shaft 66.

The carrier has a forwardly facing annular recess 87 within the sleeve portion 82 of the ring gear, and an annular member 88 is splined to the shaft 66 and extends into the recess 87, which houses a main clutch 90 for selectively disconnecting the carrier 86 from the member 88 to disengage the entire transmission. The clutch 90 includes a plurality of annular clutch discs 91 alternately connected to the carrier 86 and the member 88 and compressible against a clutch backup plate 92 by an annular actuating piston 93 mounted for reciprocation in an annular cylinder 94 at the rearward end of the recess 87. The piston 93 extends in response to fluid pressure supplied to the cylinder 94 through a passage 95 to compress the clutch discs 91 against the backup plate 92 against the bias of a clutch spring 96, formed by a plurality of Belleville washers.

A snubber brake 98 is provided to automatically stop the shafts 66 and 68 when the main clutch 90 is disengaged and includes a brake disc 99 splined to the sleeve 72 and compressible between a pair of plates 100 by a Belleville-type spring 102, the forward plate 100 being rigidly attached to the housing, while the rearward plate is shiftable. A brake piston 104 is shiftable to the left in response to fluid pressure in a passage 106 against the bias of the spring 102 and prevents the spring 102 from compressing the brake disc between the plates 100 as long as fluid pressure is supplied to the passage 106.

The control system for the brake 98 and clutch 90 is schematically illustrated and includes a pressure line 108, which is connected to both the passage 106 for the brake piston and the passage 95 for the clutch piston. The pressure in the line 108 is controlled by a control valve 110, which is actuated by the operator by means of a clutch pedal or the like and is operative to connect the line 108 to a pressure source 112, preferably the charge pump for the tractor's main hydraulic system. The Belleville spring 102 is selected so that the brake is completely released within the range of the main clutch engagement. For example, if the main clutch were gradually engaged in response to a pressure buildup in the line 108 between 35 and 50 PSI, the brake spring would be selected so that the brake would release at less than 50 PSI.

A servo control system 114 for the pump swash plate 48 is also schematically illustrated and utilizes the same source of fluid pressure 112 as the clutch and brake control system. The servo control system includes a manually actuated servo lever 115 connected at an intermediate point to a swash plate control cylinder 116, which is connected to the swash plate control arm 50. The lower end of the lever 115 is connected to a control valve 118, which supplies fluid pressure to or exhaust fluid from the cylinder 116 until the cylinder, and consequently the swash plate, arrives at a position which corresponds to the manually-controlled upper end of the lever.

The step ratio transmission 70 includes spur gears 120, 122, and 124 journaled on the shaft 68, a gear 126 meshing with the gear 122 and mounted on a countershaft 128, and a gear 130 integral with the countershaft 128. The transmission also includes an output shaft 132 having a conventional bevel gear 134 at its rearward end, which serves as the input for a conventional differential on the vehicle. The shafts 128 and 132, like the shaft 68, are journaled in the transmission housing. A spur gear 136 is journaled on the shaft 132 and meshes with the gears 120 and 130, while a second spur gear 138 on the shaft 132 meshes with the gear 126. A third gear 140 is also journaled on the shaft 132 and meshes with the gear 124. A pair of shift collars 142 and 144 are respectively mounted on the shaft 68 and are axially shiftable to selectively connect the gears 120, 122, and 124 to the shaft, while a shift collar 146 is mounted on the output shaft 132 to selectively connect the gears 136 or 140 to the output shaft 132. A fourth shift collar 148 selectively connects the gear 138 to the gear 140. The shift collars can be controlled by the operator through a conventional shift mechanism in a known manner.

The collar shift transmission provides four forward gear ratios and one reverse gear ratio. Only one loaded gear mesh is used in the second and third speeds, while two loaded gear meshes are used for reverse, and three loaded gear meshes are used for the first and fourth output speeds.

In operation, the plus or minus 18° variation in the hydrostatic unit swash plate 48 provides approximately a 2:1 infinitely variable speed ratio in the planetary output shaft 66. As is apparent, when the swash plate is in the neutral position, as illustrated, the hydrostatic unit 42 functions as a brake, so that there will be 0 output speed in the motor shaft 58, and the sun gear 76 is stationary. When the swash plate is shifted in a plus direction, the motor 52 will be driven to rotate the sun gear in the same direction as the ring gear 80, so that the speed of the carrier 86, or the output speed will be greater. Conversely, if the swash plate is shifted in the opposite direction, the motor 52 functions as a pump and the sun gear rotates in the opposite direction from the ring gear, so that the carrier will be driven at a slower speed. As mentioned above, the gear ratios are such that when the swash plate 48 is at the maximum of 18° in the plus direction, the planetary output speed is approximately one-third greater than the speed when the swash plate is at 0°, while adjustment of the swash plate for maximum reverse speed of the sun gear results in a planetary output speed that is one-third less than said speed when the hydrostatic unit is in neutral. Thus, if the gear ratios were such that the transmission provided a 4 ½ mile per hour output speed when the hydrostatic unit was in its neutral condition as illustrated, maximum adjustment of the swash plate in one direction would increase the output speed to 6 miles per hour, while adjustment in the opposite direction would reduce the speed to 3 miles per hour, giving the 2:1 variation in output speeds from the planetary unit.

In the preferred embodiment, the ratios are selected in the collar shift step ratio transmission 70 to provide speed ranges that will result in a minimum amount of shifting between ranges during actual use. For example, in the first range, the output speed of the vehicle can be varied between 1 ½ to 3 miles per hour, in the second range the speed can be varied between 3 and 6 miles per hour, in the third range the speed can be varied between 4 ½ to 9 miles per hour, and in the fourth range the speed can be varied between 9 and 18 miles per hour, while in the reverse range, the speed can be varied between 1 ¾ and 3 ½ miles per hour.

As is apparent to those familiar with agricultural tractor usage, the above ranges should permit working of the tractor without frequent shifting of ranges. The fourth range would be utilized only for transport of the vehicle, while most field work is done in the second range, between 3 and 6 miles per hour, the optimum working speed within the range being easily selected by adjusting the hydrostatic drive unit.

As is also apparent, the hydrostatic drive unit 42 transmits no power at the midpoint of each range, and generally transmits only a relatively small portion of the total power particularly at speeds near the range midpoint. It is also apparent from the above example, that there is considerable overlap between the second and third ranges, since the second and third ranges cover the speeds at which agricultural tractors are utilized approximately 90 percent of the time, the overlap eliminating shifts between ranges during actual field work. The speeds set forth above are actually rounded off, and in the actual preferred embodiment, there is a small amount of overlap between each of the ranges, except for the substantial overlap between the second and third ranges, providing infinitely variable speeds from the bottom of the first range to the top of the fourth range.

As is also apparent, only a single driving mesh in the transmission 70 is provided in second and third ranges, increasing the efficiency of the transmission. The fact that only a small portion of the power is transmitted through the hydrostatic unit, also increases the transmission efficiency. It is also apparent, that the components are compactly arranged and require no more space than needed for a power shift transmission of comparable capacity.

We claim:

1. A hydro-mechanical drive comprising: an engine driven input shaft driven at a substantially constant speed; a hydrostatic drive unit including a variable displacement, reversible pump connected to and driven by the input shaft and a fixed displacement motor hydraulically driven by the pump at infinitely variable speeds within a limited range in either direction; a planetary gear train including a ring gear operatively connected to and driven by the input shaft, a sun gear operatively connected to and driven by the motor, and a planetary pinion means constantly meshing with the ring and sun gears and carried by a carrier, so that the speed and direction of rotation of the motor affects the speed of the carrier to provide infinitely variable speed characteristics in the carrier within a limited range; a planetary output shaft; means connecting the carrier to the planetary output shaft; and a shiftable step ratio transmission having a least three different gear ratios and having an input shaft driven by the planetary output shaft to provide at least three speed ranges with infinitely variable speed characteristics.

2. The invention defined in claim 1 wherein the means connecting the carrier to the planetary output shaft includes a clutch means selectively engageable and disengageable to respectively connect or disconnect the carrier from the planetary output shaft.

3. The invention defined in claim 2 wherein the ring gear is connected to the input shaft through an axially extending sleeve member, the carrier includes an annular portion coaxially disposed within the sleeve member, and the planetary output shaft includes an annular portion coaxially disposed within the annular carrier portion, the clutch means including a plurality of clutch discs alternately connected to the annular portions of the carrier and the planetary output shaft and means for selectively compressing the adjacent clutch disc into engagement.

4. The invention defined in claim 2 and including a brake means operatively associated with the planetary output shaft and the clutch means for stopping rotation of said shaft when the clutch means is disengaged.

5. The invention defined in claim 4 wherein the clutch means includes a hydraulic motor means operative to engage the clutch means in response to fluid pressure supplied thereto, and the brake means includes a spring means biasing the brake means toward an engaged condition and a hydraulic motor means operative to shift the brake means into a disengaged condition against said spring bias in response to fluid pressure supplied thereto, and a hydraulic connecting means operatively connecting the brake and clutch hydraulic motor means to supply fluid pressure to the brake means and disengage the brake means when fluid pressure is supplied to the clutch means.

6. The invention defined in claim 1 wherein the planetary output shaft is coaxially journaled relative to the input shaft and the step-ratio transmission input shaft is coaxially connected to and driven by the planetary output shaft.

7. The invention defined in claim 1 wherein the step ratio transmission includes at least four different gear ratios, to provide at least four different ranges with infinitely variable speeds, the highest speeds of the three lowest ranges overlapping the next highest range to provide infinitely variable output speeds from the lowest speed in the lowest range to the highest speed in the fourth range.

8. The invention defined in claim 1 wherein the motor is driven at infinitely variable speeds between 0 and a predetermined speed in either direction and is operatively connected to the planetary gear train to infinitely vary the speed of the planetary output shaft within an approximate 2:1 ratio.

9. The invention defined in claim 1 wherein the hydraulic pump and motor are coaxially aligned and are parallel and adjacent to the planetary gear train.

10. A hydro-mechanical drive comprising: an engine driven input shaft driven at a substantially constant speed; an input gear means coaxially connected to and driven by the input shaft; a planetary gear train including a planetary output shaft coaxially journaled relative to the input shaft, a sun gear journaled on the output shaft, a ring gear including an axially extending sleeve portion connected to and driven by the input gear, a planetary pinion gear means constantly meshing with the ring and the sun gears and carried by an annular carrier element journaled on the output shaft and disposed within the sleeve portion of the ring gear; an annular element coaxially connected to the output shaft and coaxially disposed within the carrier element; a hydraulically actuated clutch means engageable and disengageable to respectively connect the carrier element to and disconnect the carrier element from said annular element on the output shaft and including a plurality of annular clutch discs alternately connected to the carrier element and said annular element and compressible into an engagement by an annular piston coaxially disposed within an annular cylinder formed in the carrier element; a hydrostatic drive unit including a variable displacement hydraulic pump connected to and driven by the input gear and a hydraulic motor hydraulically driven by the pump at infinitely variable speeds within a limited range and drivingly connected to the sun gear; and a shiftable step ratio transmission having a plurality of different gear ratios and including an input shaft coaxially connected to and driven by the planetary output shaft to provide a plurality of speed ranges with infinitely variable speed characteristics.

11. The invention defined in claim 10 and including a hydraulically actuated brake means operatively connected to the planetary output shaft for stopping said shaft when engaged, said brake means being biased toward an engaged condition and shiftable into a disengaged condition in response to fluid pressure supplied thereto, and also including means connecting the brake means to the clutch means for automatically supplying fluid pressure to the brake means when fluid pressure is supplied to the clutch means.

12. A hydro-mechanical drive comprising: an input shaft; a hydrostatic drive unit including a variable displacement pump connected to and driven by the input shaft and a hydraulic motor driven by the pump at infinitely variable speeds within a limited range; a differential gear train including a first element operatively connected to and driven by the input shaft, a second element operatively connected to and driven by the hydraulic motor, a third element, a plurality of pinion gear means carried by the one of said elements and constantly meshing with the other two; a differential gearing output shaft; a hydraulically actuatable clutch means operative between the third element and the output shaft to selectively connect said element to the output shaft in response to fluid pressure supplied to the clutch means; a shiftable step ratio transmission having an input shaft operatively connected to and driven by the output shaft and selectively shiftable into a plurality of different conditions to provide a plurality of different gear ratios; and a brake means operatively connected to said step ratio transmission input shaft for stopping said shaft when engaged, said brake means being biased toward its engaged position and hydraulically shifted into a disengaged position in response to fluid pressure supplied thereto; and means operatively connecting the brake means to the clutch means for automatically supplying fluid pressure to the brake means when it is supplied to the clutch means.

13. The invention defined in claim 12 wherein the brake means is biased toward an engaged position by a brake spring means and the clutch is biased toward its disengaged position by the clutch spring means, the fluid pressure supplied to the brake means and the clutch means fully shifting the brake means to its disengaged position before the clutch means is fully engaged.

14. A hydro-mechanical drive comprising: an engine driven input shaft driven at approximately a constant speed; a hydrostatic drive unit including a variable displacement reversible pump connected to and driven by the input shaft and a fixed displacement motor hydraulically driven by the pump at infinitely variable speeds within a limited range in either direction; a differential gear train including a first element operatively connected to and driven by the input shaft, a second element operatively connected to and driven by the motor, a third element, a planetary pinion means carried by one of said elements and constantly meshing with the other two, a differential gearing output shaft, and means operatively connecting the third element to said output shaft; and a shiftable step ratio transmission having an input shaft coaxially connected to and driven by the differential gearing output shaft, a counter shaft, and an output shaft parallel to the counter shaft and the input shaft, and a plurality of spur gears on said shafts, and shiftable means operatively associated with the gears in the shafts and shiftable into different positions to establish the four different drive paths through said gear means and shafts to provide at least four different gear ratios and consequently four different speed ranges, the input shaft being driven at infinitely variable speeds within a limited range by said differential gearing output shaft to provide infinitely variable speed characteristics within each of said four ranges.

15. The invention defined in claim 14 wherein the hydraulic motor is driven at infinitely variable speeds between zero and a predetermined speed in either direction and is operatively connected to the differential gear train to infinitely vary the speed of the differential gearing output shaft within an approximate 2:1 ratio, the highest speeds of the three lowest ranges overlapping the low speed of the next highest range to permit infinitely variable output speeds from the lowest speed in the lowest range to the highest speed in the fourth range.

* * * * *